US012328562B2

(12) United States Patent
Barsukou et al.

(10) Patent No.: US 12,328,562 B2
(45) Date of Patent: Jun. 10, 2025

(54) ANCHOR SILICON DIOXIDE LAYER FOR PIEZOELECTRIC MICROELECTROMECHANICAL SYSTEM MICROPHONE

(71) Applicant: SKYWORKS SOLUTIONS, INC., Irvine, CA (US)

(72) Inventors: Siarhei Dmitrievich Barsukou, Takarazuka (JP); Hiroyuki Nakamura, Osaka-Fu (JP); Keiichi Maki, Suita (JP); Takanori Yasuda, Nara (JP); Ousmane I Barry, Settsu (JP)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 46 days.

(21) Appl. No.: 17/937,830

(22) Filed: Oct. 4, 2022

(65) Prior Publication Data

US 2023/0104257 A1 Apr. 6, 2023

Related U.S. Application Data

(60) Provisional application No. 63/252,831, filed on Oct. 6, 2021.

(51) Int. Cl.
*H04R 7/18* (2006.01)
*H04R 7/08* (2006.01)

(52) U.S. Cl.
CPC ................. *H04R 7/18* (2013.01); *H04R 7/08* (2013.01); *H04R 2201/003* (2013.01)

(58) Field of Classification Search
CPC ....... H04R 7/18; H04R 7/08; H04R 2201/003
USPC .......................................................... 381/398
See application file for complete search history.

(56) References Cited

U.S. PATENT DOCUMENTS

| | | | |
|---|---|---|---|
| 9,055,372 B2 | 6/2015 | Grosh et al. | |
| 10,626,007 B2 | 4/2020 | Bretthauer et al. | |
| 10,964,880 B2 | 3/2021 | Grosh et al. | |
| 2011/0051985 A1 | 3/2011 | Hwang et al. | |
| 2013/0121509 A1* | 5/2013 | Hsu ...................... | H04R 19/013 438/22 |
| 2016/0219374 A1 | 7/2016 | Hall et al. | |

(Continued)

FOREIGN PATENT DOCUMENTS

| | | |
|---|---|---|
| EP | 3557881 A1 | 10/2019 |
| JP | 2008118639 A | 5/2008 |
| JP | 2019140638 A | 8/2019 |

OTHER PUBLICATIONS

Chen et al. "Acoustic Transducers Built on Edge-released MEMS Structures," Solid-State Sensors, Actuators, and Microsystems Workshop Hilton Head Island, South Carolina, Jun. 6-10, 2010, pp. 234-237.

(Continued)

*Primary Examiner* — Sean H Nguyen
(74) *Attorney, Agent, or Firm* — Lando & Anastasi, LLP

(57) ABSTRACT

A piezoelectric microelectromechanical system microphone comprises a support substrate, a membrane including a piezoelectric material attached to the support substrate and configured to deform and generate an electrical potential responsive to impingement of sound waves on the membrane, and a compliant anchor including a trench defined in the support substrate about a portion of a perimeter of the membrane to increase sensitivity of the piezoelectric microelectromechanical system microphone.

18 Claims, 23 Drawing Sheets

(56) References Cited

U.S. PATENT DOCUMENTS

| | | | |
|---|---|---|---|
| 2016/0219375 | A1 | 7/2016 | Hall et al. |
| 2017/0085994 | A1 | 3/2017 | Clerici et al. |
| 2017/0186940 | A1 | 6/2017 | Bevilacqua et al. |
| 2018/0091905 | A1 | 3/2018 | Clerici et al. |
| 2019/0281393 | A1 | 9/2019 | Grosh et al. |
| 2019/0327562 | A1 | 10/2019 | Cerini et al. |
| 2020/0148532 | A1 | 5/2020 | Grosh et al. |
| 2020/0351595 | A1 | 11/2020 | Rusconi Clerici Beltrami et al. |
| 2020/0382876 | A1 | 12/2020 | Cerini et al. |
| 2021/0051413 | A1 | 2/2021 | Hui et al. |
| 2021/0084423 | A1 | 3/2021 | Rusconi Clerici Beltrami et al. |
| 2021/0120346 | A1 | 4/2021 | Hui et al. |
| 2021/0136483 | A1 | 5/2021 | Hsieh et al. |
| 2021/0385584 | A1 | 12/2021 | Goswami et al. |
| 2022/0073342 | A1 | 3/2022 | Ho et al. |
| 2022/0267141 | A1 | 8/2022 | Chen et al. |
| 2022/0272459 | A1 | 8/2022 | Chen et al. |
| 2022/0332568 | A1 | 10/2022 | Barsukou |
| 2022/0402752 | A1 | 12/2022 | Goswami et al. |
| 2023/0007405 | A1 | 1/2023 | Qian et al. |
| 2023/0011561 | A1 | 1/2023 | Qian et al. |
| 2023/0012046 | A1 | 1/2023 | Qian et al. |
| 2023/0039743 | A1 | 2/2023 | Hui et al. |
| 2023/0072672 | A1 | 3/2023 | Chen et al. |
| 2023/0105699 | A1 | 4/2023 | Chen et al. |
| 2023/0127983 | A1 | 4/2023 | Chen et al. |
| 2023/0188896 | A1 | 6/2023 | Barsukou |
| 2023/0234837 | A1 | 7/2023 | Chen et al. |
| 2023/0239641 | A1 | 7/2023 | Chen et al. |
| 2023/0303387 | A1 | 9/2023 | Barsukou |
| 2024/0098426 | A1 | 3/2024 | Barsukou |

OTHER PUBLICATIONS

Chen et al., "Edge-released, piezoelectric MEMS acoustic transducers in array configuration," J. Micromech. Microeng. 22 (2012) 025005, pp. 1-9.

Huang et al., "High Sensitivity and High S/N Microphone Achieved by PZT Film with Central-Circle Electrode Design", IEEE, MEMS 2017, Las Vegas, NV, USA, Jan. 22-26, 2017, pp. 1188-1191.

Knisely et al., "Method for Controlling Stress Gradients in PVD Aluminum Nitride", Journal of Micromechanics and Microengineering, vol. 28, No. 11, 2018.

Littrell, "High Performance Piezoelectric MEMS Microphones", A dissertation submitted in partial fulfillment of the requirements for the degree of Doctor of Philosophy (Mechanical Engineering) in The University of Michigan, 2010, 111 pages.

Mohamad et al., "Modelling and Optimisation of a Spring-Supported Diaphragm Capacitive MEMS Microphone", Engineering, 2010, 2, 762-770.

PeñA-garcía et al., "Design and Modeling of a MEMS Dual-Backplate Capacitive Microphone with Spring-Supported Diaphragm for Mobile Device Applications," Sensors (2018), 18, 3545, 30 pages.

Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.

Segovia-Fernandez et al., "Monolithic Piezoelectric Aluminum Nitride MEMS-CMOS Microphone", IEEE (2017), Transducers 2017, Kaohsiung, Taiwan, Jun. 18-22, 2017, pp. 414-417.

Udvardi et al., Spiral-Shaped Piezoelectric MEMS Cantilever Array for Fully Implantable Hearing Systems. Micromachines (2017) 8, 311, 13 pages.

Williams et al., "An AIN MEMS Piezoelectric Microphone for Aeroacoustic Applications", Journal of Microelectromechanical Systems, vol. 21, No. 2, Apr. 2012, pp. 270-283.

Yamashita et al., "Diaphragm deflection control of piezoelectric ultrasonic microsensors for sensitivity improvement", Sensors and Actuators A 139 (2007), pp. 118-123.

Yan et al., "Corrugated Diaphragm for Piezoelectric Microphone", IEEE, 1996, pp. 503-506.

Ali Shah et al., "Design Approaches of MEMS Microphones for Enhanced Performance," Hindawi, Journal of Sensors, vol. 2019, Article ID 9294528, 26 pages.

Je et al., "In situ tuning of a MEMS microphone using electrodeposited nanostructures," Journal of Micromechanics and Microengineering, 19 (2009) 035015, pp. 1-8.

Je et al., "MEMS Capacitive Microphone with Dual-Anchored Membrane," Proceedings 2017, 1, 342, 5 pages.

Lo et al., "Development of a No-Back-Plate SOI MEMS Condenser Microphone," IEEE, Transducers 2015, Anchorage, Alaska, Jun. 21-25, 2015, pp. 1085-1088.

Lo et al., "Sensitivity Improvement of No. Back-Plate MEMS Microphone Using Polysilicon Trench-refilled Process," EEE, Transducers 2017, Kaohsiung, Taiwan, Jun. 18-22, 2017, pp. 1171-1174.

* cited by examiner

THE REFERENCE:

ANCHOR SILICON DIOXIDE LAYER FOR PIEZOELECTRIC MICROELECTROMECHANICAL SYSTEM MICROPHONE

CROSS-REFERENCE TO RELATED APPLICATIONS

This application claims priority under 35 U.S.C. § 119(e) to U.S. Provisional Patent Application Ser. No. 63/252,831, titled "ANCHOR SILICON DIOXIDE LAYER FOR PIEZOELECTRIC MICROELECTROMECHANICAL SYSTEM MICROPHONE," filed Oct. 6, 2021, the entire contents of which is incorporated herein by reference for all purposes.

BACKGROUND

Technical Field

Embodiments disclosed herein relate to piezoelectric microelectromechanical system microphones and to devices including same.

Description of Related Technology

A microelectromechanical system (MEMS) microphone is a micro-machined electromechanical device to convert sound pressure (e.g., voice) into an electrical signal (e.g., voltage). MEMS microphones are widely used in mobile devices such as cellular telephones, headsets, smart speakers, and other voice-interface devices/systems. Capacitive MEMS microphones and piezoelectric MEMS microphones (PMMs) are both available in the market. PMMs requires no bias voltage for operation, therefore, they provide lower power consumption than capacitive MEMS microphones. The single membrane structure of PMMs enable them to generally provide more reliable performance than capacitive MEMS microphones in harsh environments. Existing PMMs are typically based on either cantilever MEMS structures or diaphragm MEMS structures.

SUMMARY

In accordance with one aspect, there is provided a piezoelectric microelectromechanical system microphone. The piezoelectric microelectromechanical system microphone comprises a support substrate, a membrane including a piezoelectric material attached to the support substrate and configured to deform and generate an electrical potential responsive to impingement of sound waves on the membrane, and a compliant anchor including a trench defined in the support substrate about a portion of a perimeter of the membrane to increase sensitivity of the piezoelectric microelectromechanical system microphone.

In some embodiments, the support substrate includes an upper layer of silicon dioxide and the trench is formed in the upper layer of silicon dioxide.

In some embodiments, the trench extends through an entirety of a thickness of the upper layer of silicon dioxide.

In some embodiments, the compliant anchor extends about a majority of a perimeter of the membrane.

In some embodiments, the membrane is circular.

In some embodiments, the trench has a length and substantially same width along an entirety of the length.

In some embodiments, the trench has a same height as the membrane.

In some embodiments, an inner wall of the trench is aligned with an outer edge of the membrane.

In some embodiments, the piezoelectric microelectromechanical system microphone further comprises a polymer disposed in the trench.

In some embodiments, the piezoelectric microelectromechanical system microphone further comprises a material disposed in the trench and having a temperature coefficient of expansion opposite in sign to a temperature coefficient of expansion of silicon dioxide.

In some embodiments, the piezoelectric microelectromechanical system microphone further has a diaphragm type structure.

In some embodiments, the piezoelectric microelectromechanical system microphone further has a cantilever type structure.

In some embodiments, the compliant anchor is formed of a silicon dioxide film having a greater height than a width.

In some embodiments, the trench defines an outer surface of the silicon dioxide film.

In some embodiments, a lower surface of the silicon dioxide film is adhered to a silicon portion of the support substrate.

In some embodiments, the piezoelectric microelectromechanical system microphone is included in an electronics device module.

In some embodiments, the electronic device module is included in an electronic device.

In some embodiments, the electronic device module is included in a telephone.

In accordance with another aspect, there is provided a method of forming a piezoelectric microelectromechanical system microphone. The method comprises attaching a membrane including a piezoelectric material to a support substrate, the membrane configured to deform and generate an electrical potential responsive to impingement of sound waves on the membrane, and defining a compliant anchor including a trench in the support substrate about a portion of a perimeter of the membrane to increase sensitivity of the piezoelectric microelectromechanical system microphone.

In some embodiments, the support substrate includes an upper layer of silicon dioxide and defining the compliant anchor includes forming trench in the upper layer of silicon dioxide.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
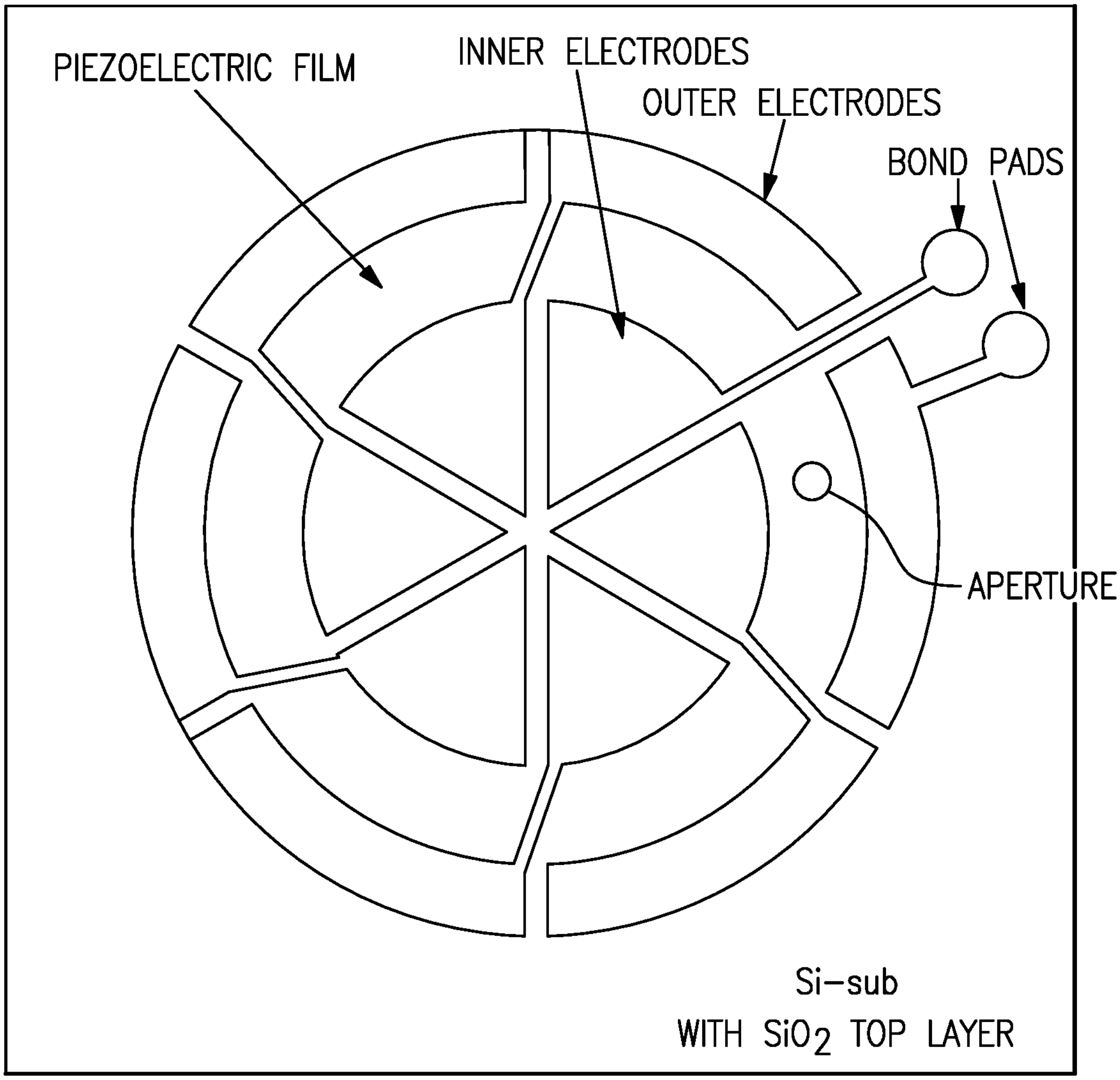
FIG. 1A is a plan view of an example of a diaphragm piezoelectric microelectromechanical system microphone (PMM)

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects and embodiments disclosed herein involve engineering of the anchor structure of a piezoelectric microelectromechanical system microphone (PMM) to improve the sensitivity of the microphone. Aspects and embodiments of the anchor structure disclosed herein may be applied to both diaphragm-type PMMs and cantilever-type PMMs.

Figure 1B:
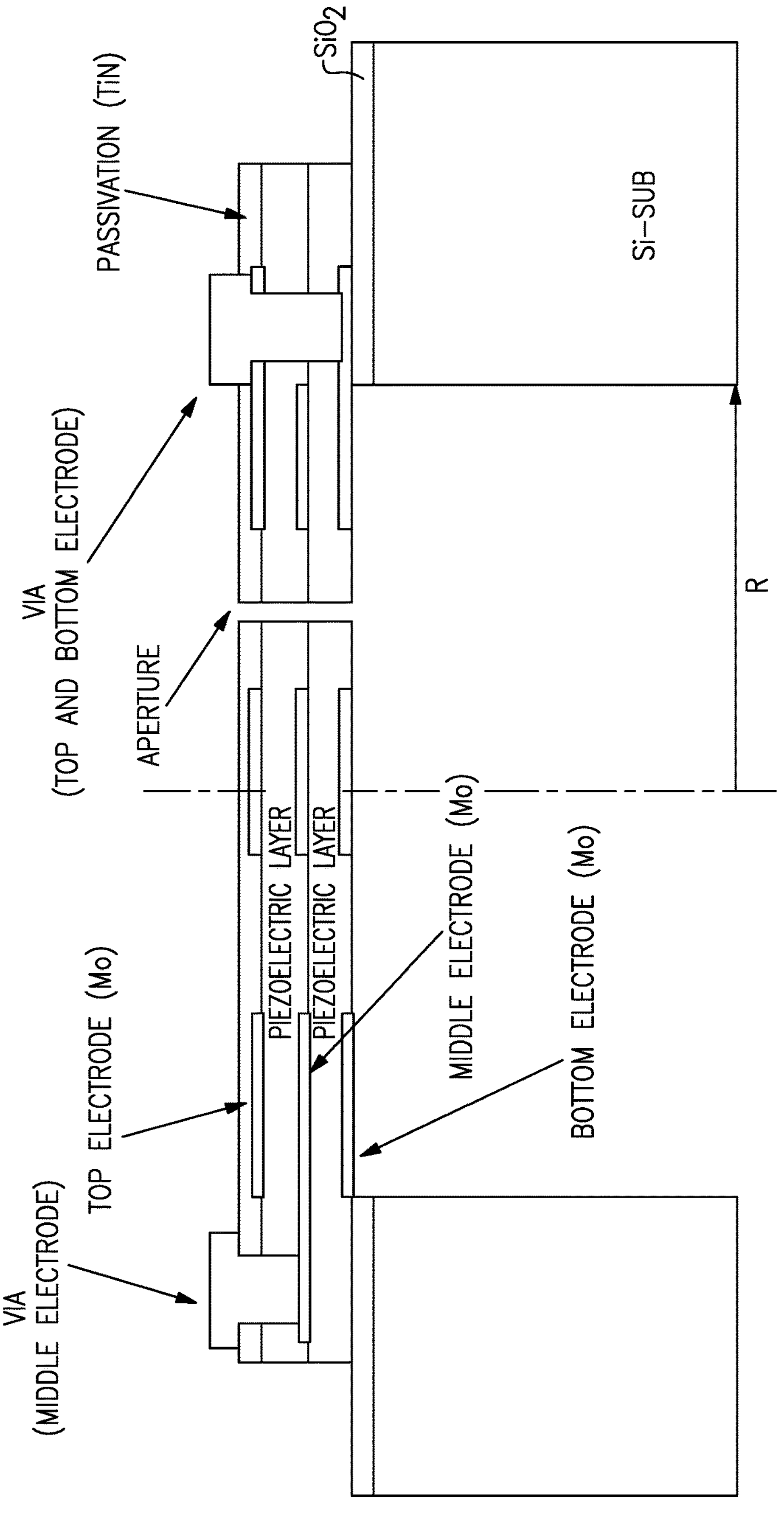
FIG. 1B is a cross-sectional view of the diaphragm PMM of FIG. 1A.

An example of a diaphragm-type PMM is illustrated in a plan view in FIG. 1A and in cross-sectional view in FIG. 1B.

The diaphragm may be formed of a piezoelectric material, for example, aluminum nitride (AlN), that generates a voltage difference across different portions of the diaphragm when the diaphragm deforms or vibrates due to the impingement of sound waves on the diaphragm. Although illustrated as circular in FIG. 1A, the diaphragm may have a circular, rectangular, or polygonal shape. In the example of FIGS. 1A and 1B, the diaphragm structure is fully clamped all around its perimeter by adhesion of the entire perimeter of the piezoelectric material of the diaphragm to a layer of $SiO_2$ disposed on a Si substrate. This is referred to herein as a "full anchor" structure. To improve low-frequency roll-off control ($f_{-3dB}$ control) one or more vent holes or apertures may be formed in the diaphragm structure that may be well defined by photolithography. The ventilation hole(s) or aperture(s) release over pressure which may occur under the membrane in the back volume of the microphone under external action (pressure). If there is no ventilation hole or aperture the applied external pressure will increase the pressure under the membrane to compensate for the applied external pressure. In the absence of the ventilation hole or aperture the membrane may thus be resistant to deflection and may exhibit reduced sensitivity. Too big a ventilation hole or aperture, however, may degrade the −3 dB roll off frequency of the microphone. The combination of the Si substrate and layer of $SiO_2$ may together be considered a support substrate for the diaphragm.

The diaphragm PMM of FIGS. 1A and 1B has a circular diaphragm formed of two layers of piezoelectric material, for example, AlN, that is clamped at its periphery on a layer of $SiO_2$ formed on a Si substrate with a cavity defined in the substrate below the diaphragm. The circular diaphragm PMM includes a plurality of pie-piece shaped sensing/active inner electrodes disposed in the central region of the diaphragm that are segmented and separated from one another by gaps. Outer sensing/active electrodes, segmented and separated circumferentially from one another by gaps, are positioned proximate a periphery of the diaphragm and extend inward from the clamped periphery a portion of the radius of the diaphragm toward the inner electrodes. Each outer sensing electrode is directly electrically connected to a corresponding inner sensing electrode by an electrical trace or conductor segment. Open areas that are free of sensing/active electrodes are defined between the inner electrodes and outer electrodes. The electrode segmentation and electrical connection between electrodes are designed to achieve desired output electrical parameters such as output voltage (sensitivity) and output electrical capacitance. In some embodiments, the electrodes may not be segmented into multiple sectors.

The inner electrodes and outer electrodes each include top or upper electrodes disposed on top of an upper layer of piezoelectric material of the diaphragm, bottom or lower electrodes disposed on the bottom of the lower layer of piezoelectric material of the diaphragm, and middle electrodes disposed between the upper and lower layers of piezoelectric material. The multiple inner and outer electrodes are electrically connected in series between the two bond pads, except for inner and outer electrode segment pairs having electrical connection directly to the bond pads. The top and bottom electrodes of each inner and outer electrode segment pair are electrically connected to the middle electrode in an adjacent inner and outer electrode segment pair. Vias to the middle electrode of one inner and outer electrode segment pair and to the top and bottom electrodes of an adjacent inner and outer electrode segment pair are used to provide electrical connection between the bond pads and electrodes. The electrodes are indicated as being Mo, but could alternatively be Al, Ru, Ti, Pt or any other suitable metal, alloy, or non-metallic conductive material.

Diaphragm structures generate maximum stress and piezoelectric charges in the center and near the edge of the diaphragm. The stresses in the center and near the edge of the diaphragm have opposite polarity resulting in opposite electrical potential occurring on the metal electrodes in the center versus near the edge of the diaphragm. The charges in the center and edge have opposite polarities. Additionally, diaphragm structures generate piezoelectric charges at the top and the bottom surfaces and the charge polarities are opposite on the top and bottom surfaces in the same area. The resulting charge distribution produces an electric field in the different regions of the piezoelectric membrane which causes different electric potentials to be formed on the different (edge versus center) conductive electrodes. Partial sensing electrodes in the diaphragm center and near the anchor may be used for maximum output energy and sensitivity and to minimize parasitic capacitance.

A diaphragm PMM may include one, two, or multiple piezoelectric material film layers in the diaphragm. In embodiments including two piezoelectric material film layers, as discussed above, conductive layers forming sensing/active electrodes may be deposited on the top and the bottom of the diaphragm, as well as between the two piezoelectric material film layers, forming a bimorph diaphragm structure. Partial sensing electrodes may be employed. Inner electrodes may be placed in the center of diaphragm and outer electrodes may be placed near the anchor/perimeter of the diaphragm. Sensing/active electrodes may be placed on the bottom and top, and in the middle of the vertical extent of the multi-layer piezoelectric film forming the diaphragm. The size of the sensing/active electrodes may be selected to collect the maximum output energy ($E=0.5*C*V^2$).

Figure 2A:
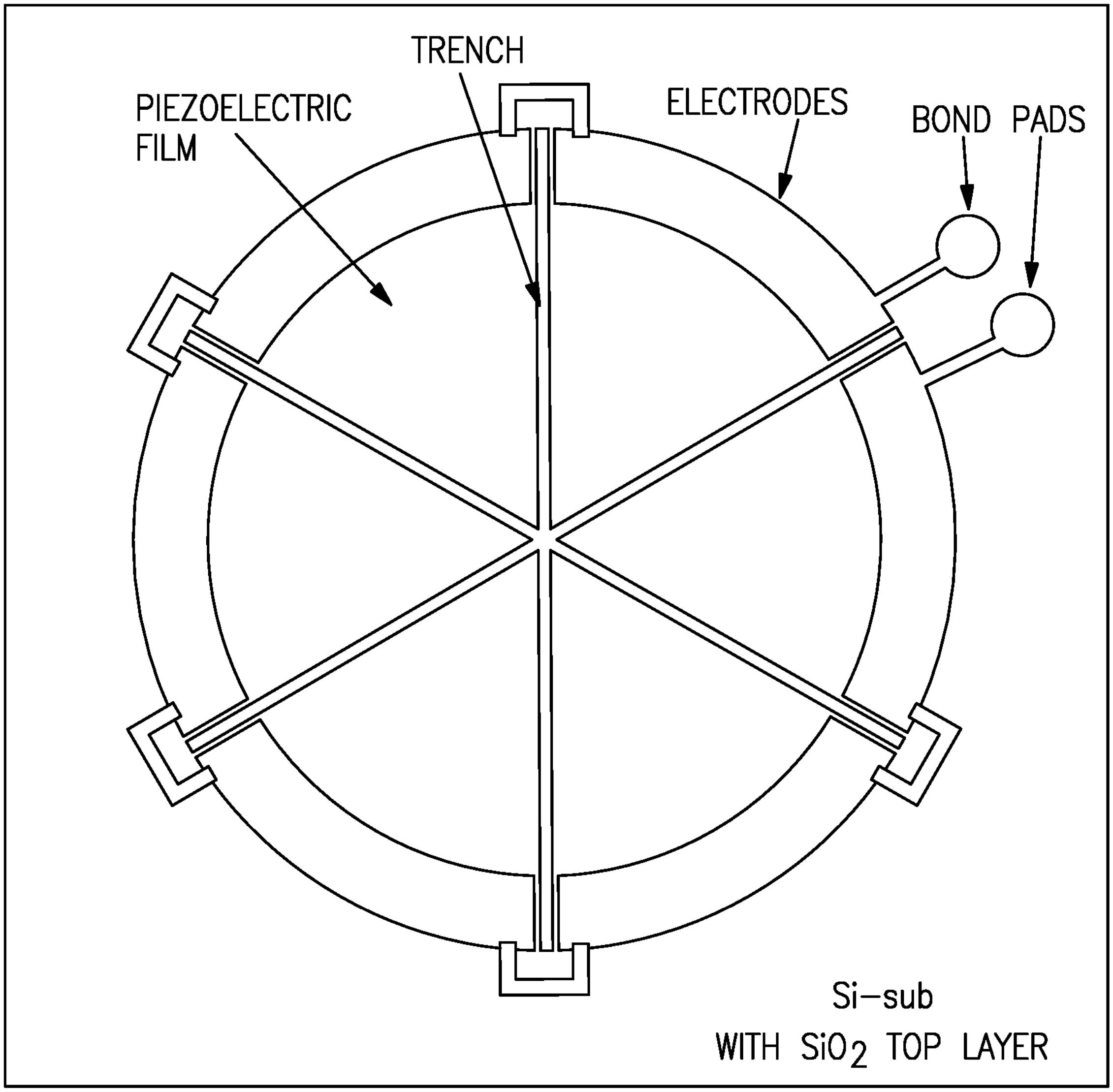
FIG. 2A is a plan view of an example of a cantilever PMM.
Figure 2B:
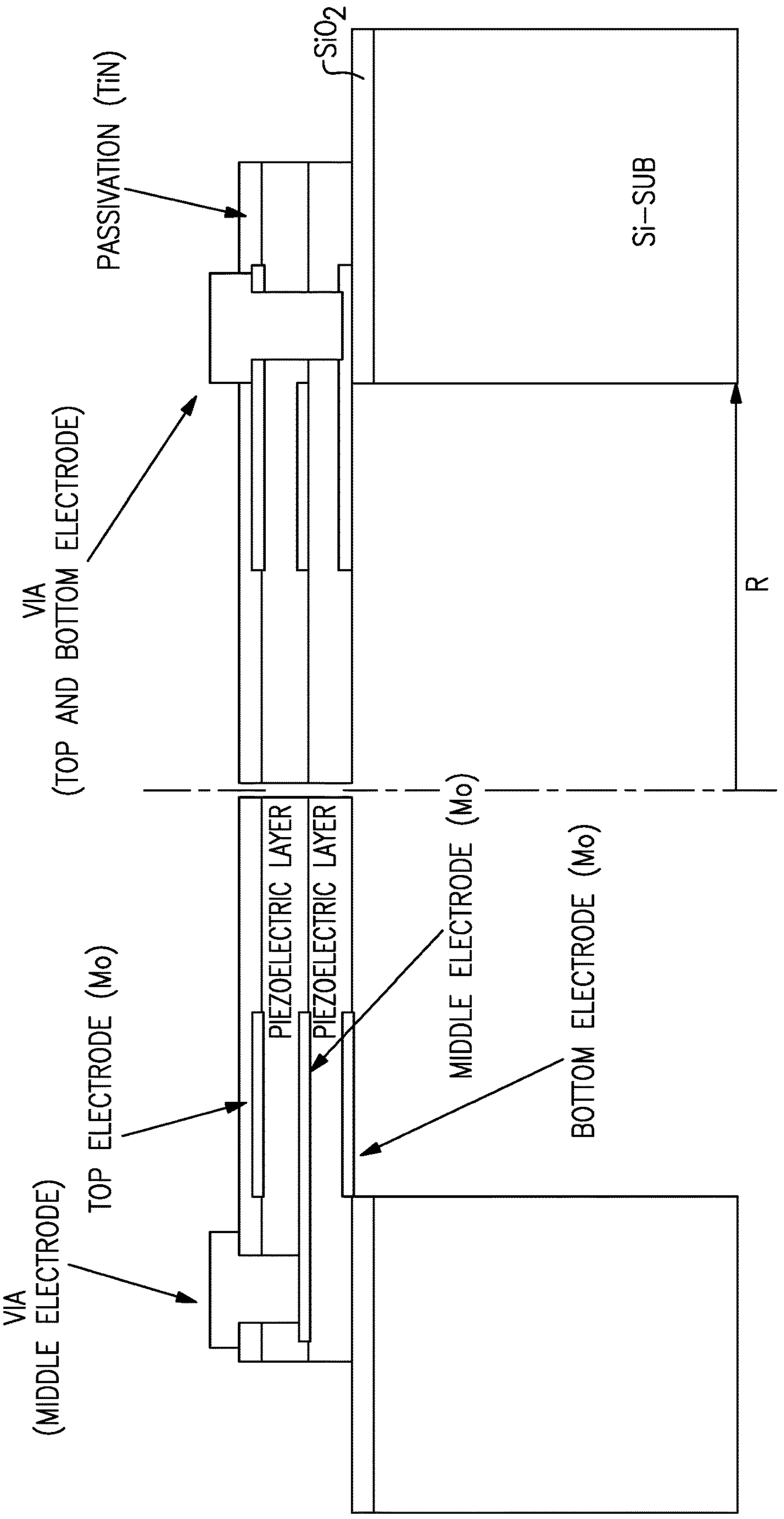
FIG. 2B is a cross-sectional view of the cantilever PMM of FIG. 2A.

One example of a cantilever PMM is illustrated in a plan view in FIG. 2A and in a cross-sectional view in FIG. 2B. The cantilever PMM includes six cantilevers and top, middle, and bottom sensing/active electrodes proximate the bases of the cantilevers. Cantilever MEMS microphone structures generate the maximum stress and piezoelectric charges near the edge of the anchor portion of the cantilever structure. Therefore, partial sensing electrodes near the anchor may be used for maximum output energy. The cantilevers are pie-piece shaped and together form a circular microphone structure with trenches (gaps) between adjacent cantilevers. It should be appreciated that in alternate embodiments, the cantilever structures could be shaped other than as illustrated, for example, as polygons with three or more straight or curved sides. The cantilevers have bases mounted on a support substrate including a $SiO_2$ layer on a Si substrate. The top, bottom, and middle sensing/active electrodes in the different cantilevers are connected in series between the bond pads, except for the cantilevers having electrical connection between the electrodes and bond pads. The top and bottom electrodes of each cantilever are electrically connected to the middle electrode in an adjacent cantilever. Vias to the middle electrode of one cantilever and to the top and bottom electrodes of an adjacent cantilever are used to provide electrical connection between the bond pads and cantilever electrodes. The electrodes are indicated as being Mo, but could alternatively be Ru or any other suitable metal, alloy, or non-metallic conductive material.

In some embodiments, the layer of $SiO_2$ on the surface of the support substrate upon which the membranes formed by the stack of piezoelectric material and electrodes of a PMM is disposed may have a thickness of from about 1 μm to about 5 μm. As illustrated in FIGS. 1B and 2B, the support substrate including the Si substrate and layer of $SiO_2$ typically extends outward beyond the periphery of the PMM membrane. The layer of $SiO_2$ constrains the periphery of the PMM membrane. In some instances, due to variations in the manufacturing process for the PMM membranes, residual stresses may remain within the PMM membranes. Due to the constraint of the periphery of the PMM membranes by the layer of $SiO_2$ to which they are bonded, the PMM membranes cannot expand or contract to relieve the residual stresses. In some instances, the residual stresses may cause the PMM membrane to be more stiff than desirable, which may decrease the sensitivity of the PMM.

In various aspects and embodiments disclosed herein the anchor structure of a PMM may be engineered to increase compliance of the anchor and provide for some expansion or contraction of the PMM membrane. This may provide for residual stresses to be relieved and for the sensitivity of the PMM to be increased. By partially etching of the support $SiO_2$ layer the performance of a PMM may thus be improved. By engineering the support $SiO_2$ layer in such a manner, the mechanical parameters of the vibration system may be improved: the effective sensor compliance and stress-charge distribution in the piezoelectric films of the PMM membrane may be optimized or at least improved.

The partially etched $SiO_2$ layer represents an anchor structure that effects the compliance of the mechanical system including the PMM membrane. The stress and displacement distributions induced in the piezoelectric material layers of the PMM membrane due to impingement of external sound also depend on the $SiO_2$ anchor structure configuration. Increased stress leads to more charge induced in the PMM membrane due to the piezoelectric effect. The achievable sensitivity and total sensor performance may be improved by the structures and methods disclosed herein.

Figure 3A:
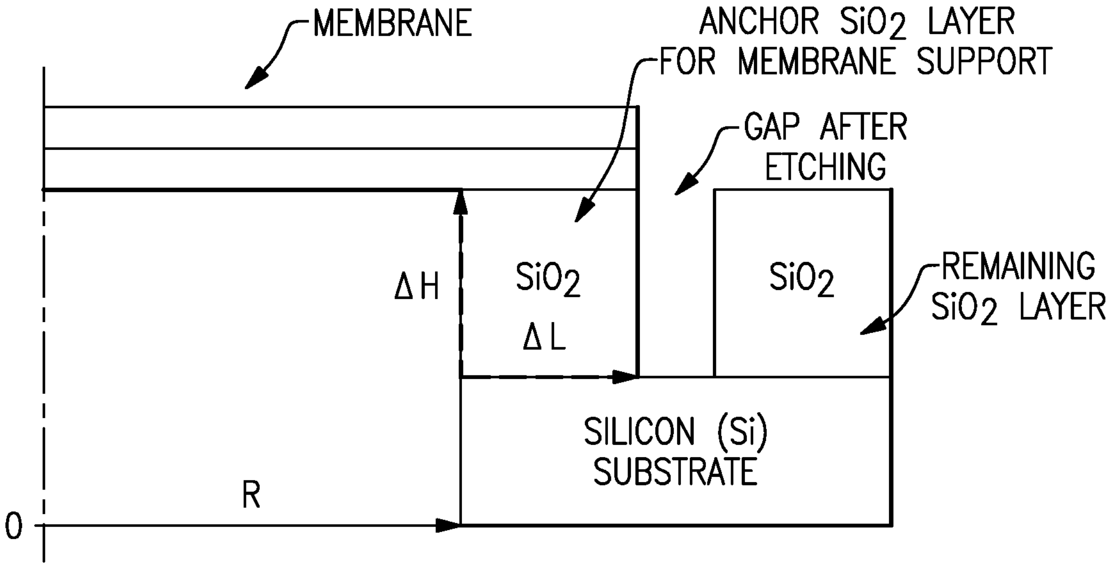
FIG. 3A is a partial cross-sectional view of an example of a compliant anchor section fora PMM.
Figure 3B:
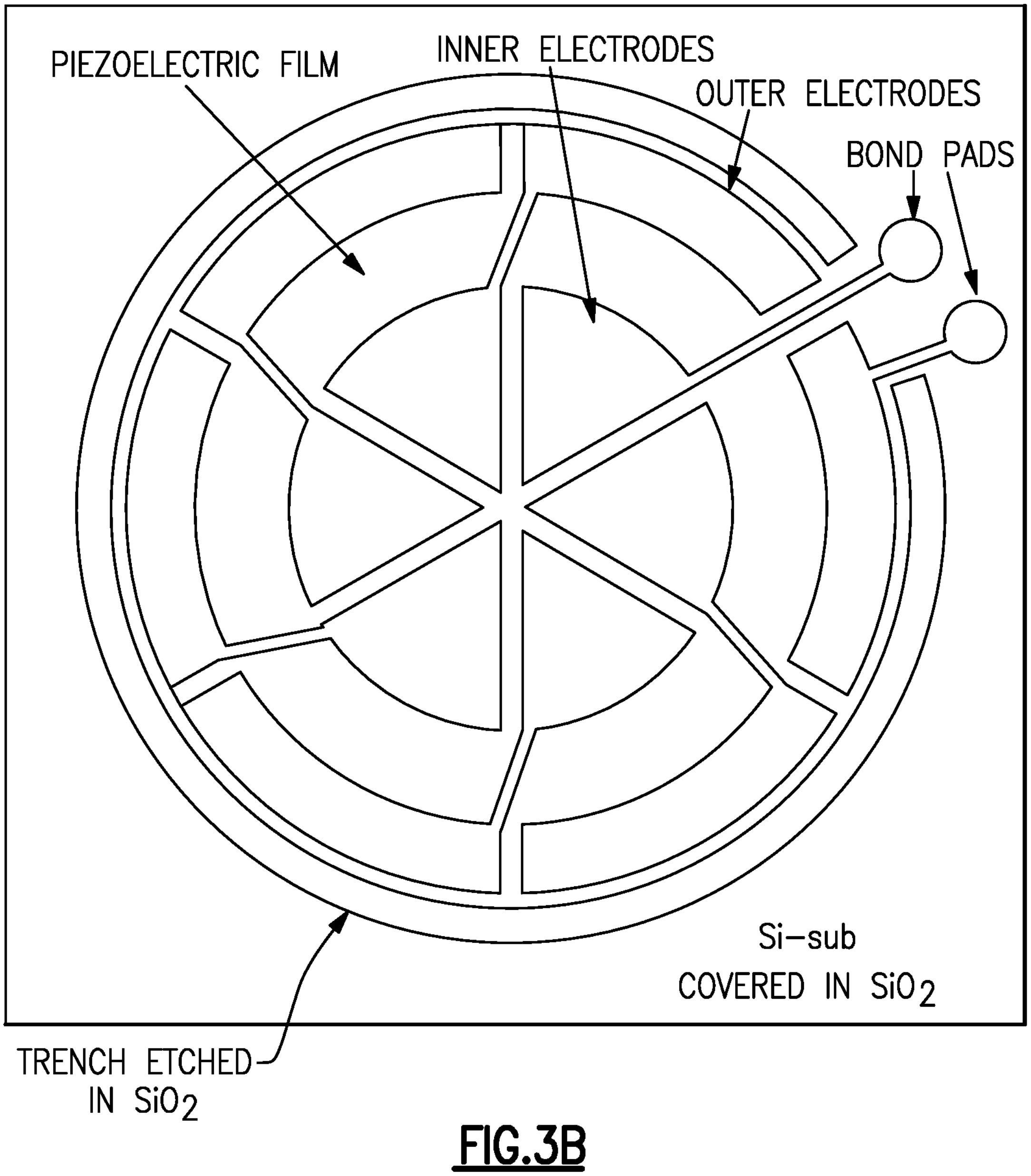
FIG. 3B is a plan view of an example of a diaphragm PMM.

One example of a modified $SiO_2$ anchor structure for a PMM (either diaphragm-type or cantilever-type) is illustrated in cross-section in FIG. 3A. FIG. 3A omits many of the details of the PMM membrane structure for clarity. Only one side of the PMM is illustrated in FIG. 3A; it is to be understood that the anchor region about the majority or the whole of the PMM membrane may be similarly configured. As illustrated in FIG. 3A, a trench is etched in the $SiO_2$ layer upon which the PMM membrane is disposed. An inner edge of the trench may be aligned with the peripheral or outer edge of the PMM membrane. The trench may extend through the entirety of the $SiO_2$ layer and expose an upper surface of the Si substrate. The width of the trench is not of great significance but should not be so large as to interfere with any other structures or devices adjacent to the PMM. The width of the trench may be, for example, between about 0.5 μm and about 5 μm. The width of the trench may be substantially the same over the entirety or at least a majority of the length of the trench. The height Δh and the width Δl of the remaining anchor $SiO_2$ layer may be selected to achieve desired PMM performance properties as described in further detail below. FIG. 3B is a plan view of a diaphragm type PMM including a trench formed in the $SiO_2$ about a periphery of the PMM membrane. A portion of the $SiO_2$ around the periphery of the PMM membrane is left unetched to facilitate routing of electrical connections to the PMM bond pads.

Figure 4:
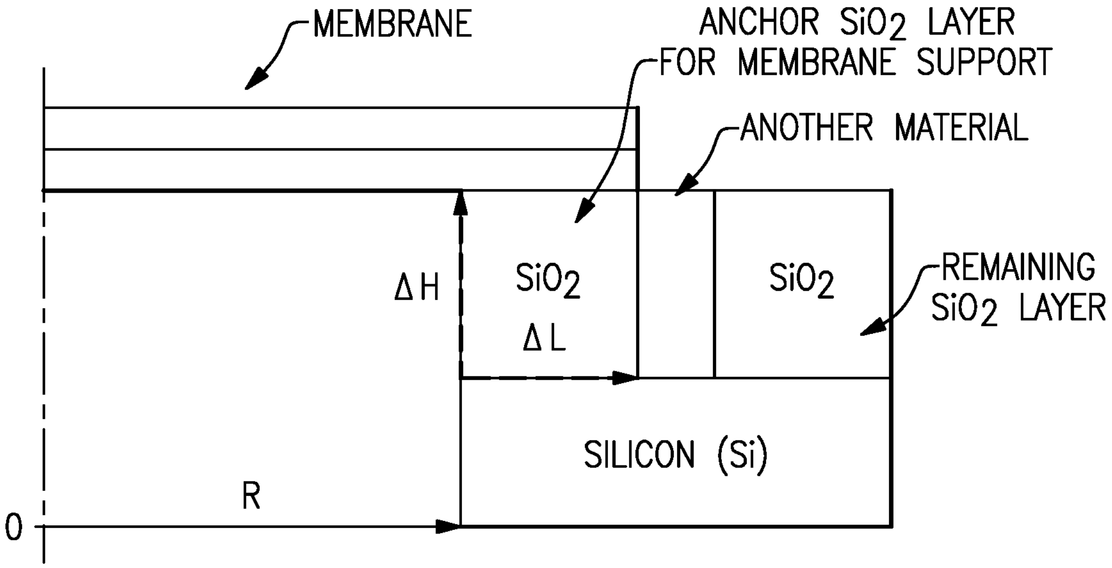
FIG. 4 is a partial cross-sectional view of another example of a compliant anchor section for a PMM.

In FIG. 3A, the trench in the $SiO_2$ layer is empty (or filled with air). In other embodiments, for example, as illustrated in FIG. 4, the trench may be filled with a material having a high compliance, for example, a resin, epoxy, polyimide, silicone, another polymer, etc., and/or a material that provides for thermal expansion compensation by exhibiting a coefficient of thermal expansion opposite in sign to that of $SiO_2$.

Figure 5:
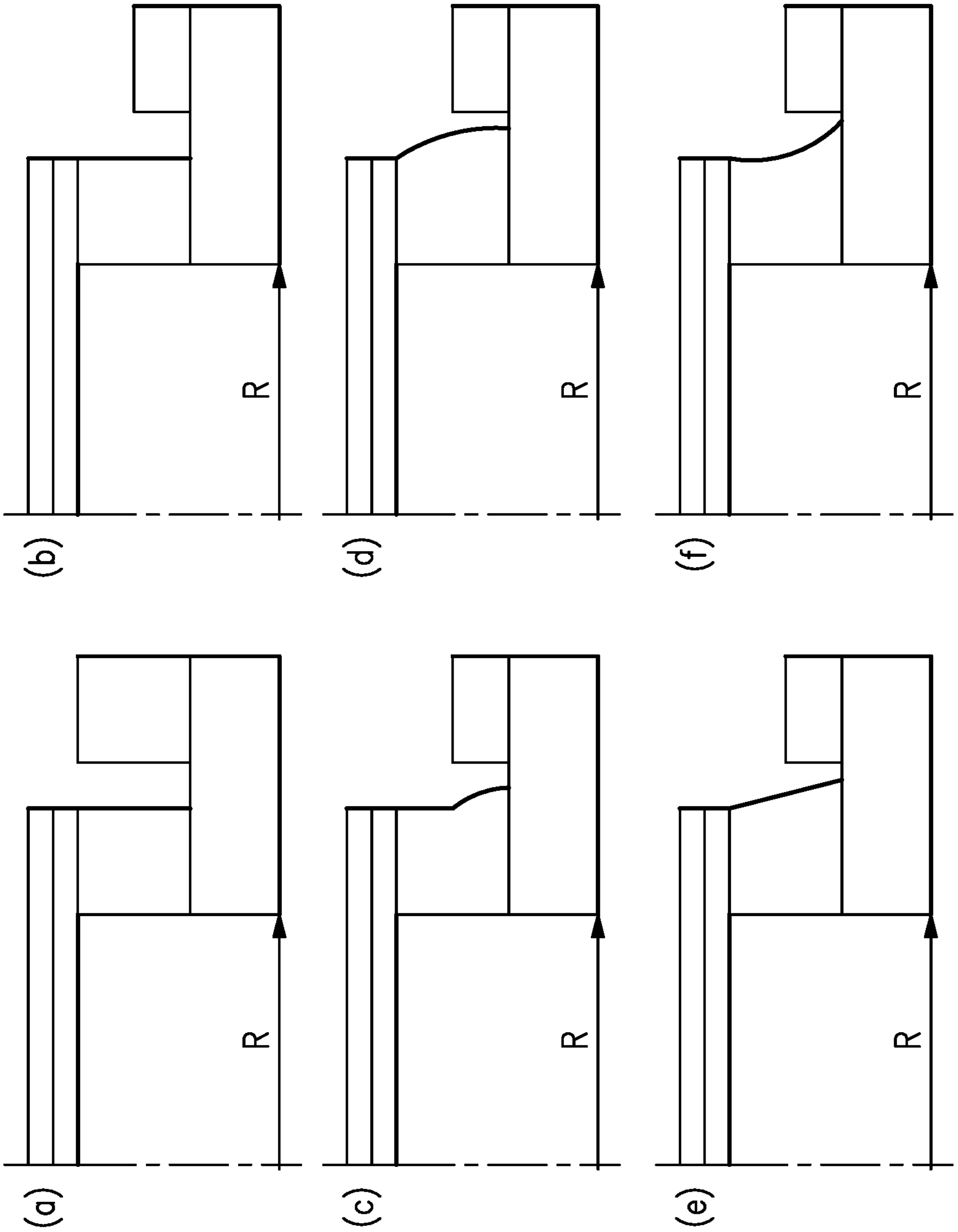
FIG. 5 illustrates cross-sectional views of other examples of compliant anchor sections for PMMs.

The outer sidewall of the $SiO_2$ anchor layer and the height of this layer relative to the $SiO_2$ layer covering the other portions of the Si substrate may be configured in several different manners. As illustrated in FIG. 5, a) the sidewalls of both sides of the gap and the sidewall of the $SiO_2$ anchor layer may be vertical and the $SiO_2$ anchor layer may have the same height as the $SiO_2$ covering the other portions of the Si substrate, b) the $SiO_2$ anchor layer may have a different, for example, greater height as the $SiO_2$ covering the other portions of the Si substrate, c) the outer sidewall of the $SiO_2$ anchor layer may include a portion that is convex, d) the outer sidewall of the $SiO_2$ anchor layer may be convex along its entire height, e) the outer sidewall of the $SiO_2$ anchor layer may be linearly tapered along its entire height, or f) the outer sidewall of the $SiO_2$ anchor layer may be concave along its entire height.

Figure 6A:
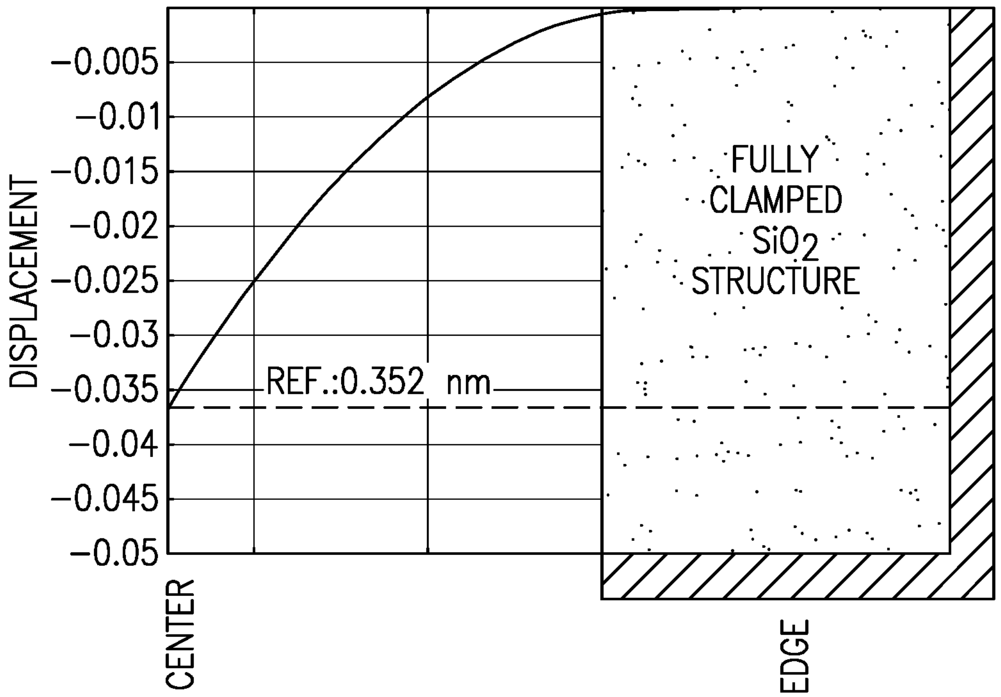
FIG. 6A illustrates results of a simulation of membrane displacement as a function of distance across a membrane of an example of a PMM having a reference anchor structure.
Figure 6B:
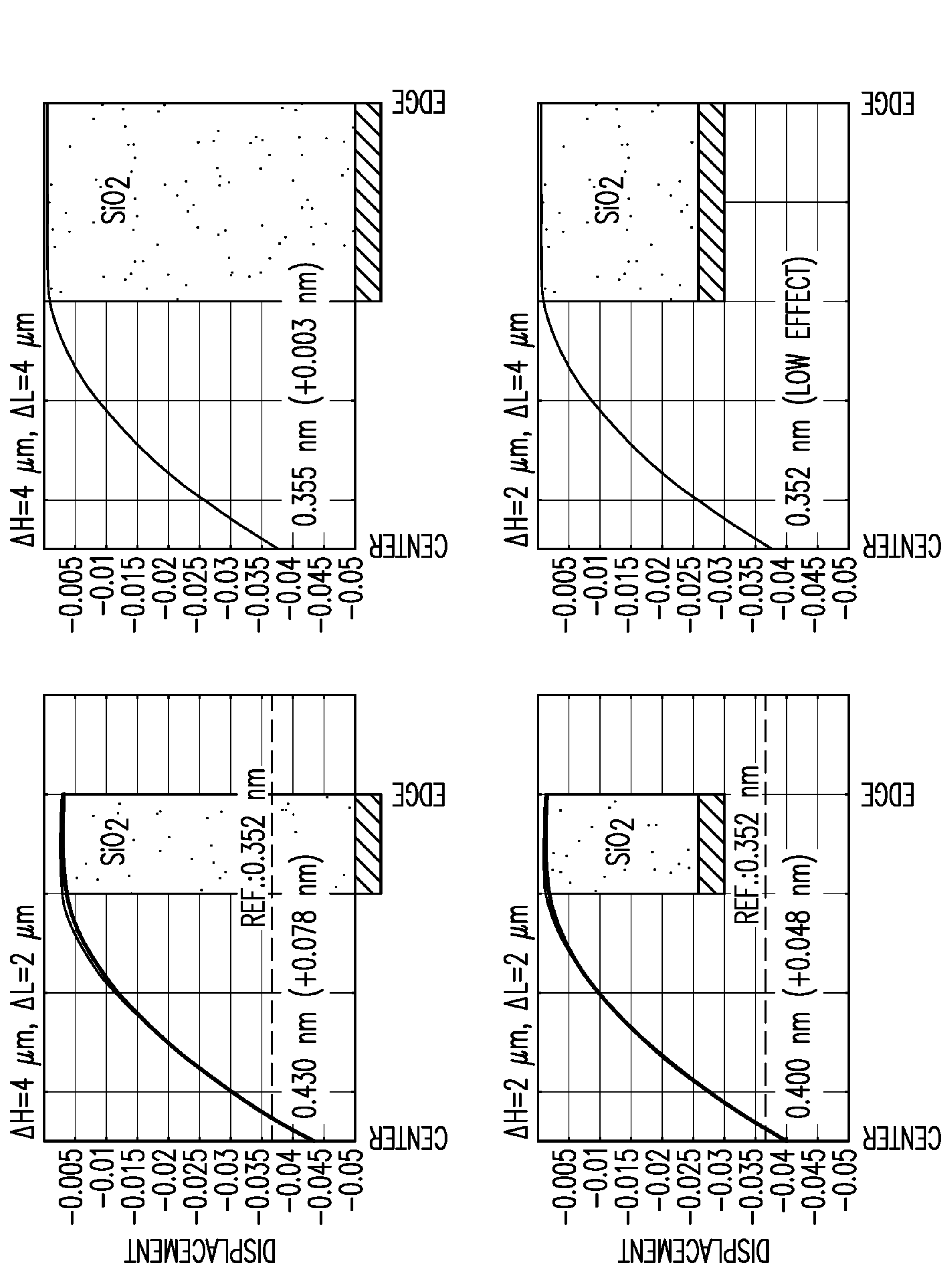
FIG. 6B illustrates results of simulations of membrane displacement as a function of distance across membranes in example PMMs having anchor structures with different dimensions and constrained surfaces than the reference anchor structure of FIG. 6A.

Simulations were performed to determine the effect on sensitivity (membrane displacement) of a diaphragm-type PMM having an anchor structure as illustrated in FIG. 3A with different values of height Δh and width Δl. In the simulated PMM, the membrane had a bimorph structure such as illustrated in FIG. 1B with a radius of 400 μm, Mo electrodes with thicknesses of 30 nm, piezoelectric material layers of 20% Sc-doped AlN with thicknesses of 300 nm, and an external applied sound pressure of 1 Pa. A reference structure was configured as illustrated in FIG. 6A in which the $SiO_2$ anchor was fully constrained on its lower and outside edges and had a height Δh of 3 μm and a width Δl of 3 μm. The reference structure exhibited a deformation of 0.352 nm at the membrane center as illustrated in FIG. 6A. In comparative simulations the $SiO_2$ anchor was fully constrained on its lower end but unconstrained on its outer side and the height Δh and width Δl parameters were changed. The height and width parameters of the comparative simulations included Δh=4 μm and Δl=2 μm, Δh=4 μm and Δl=4 μm, Δh=2 μm and Δl=2 μm, and Δh=2 μm and Δl=4 μm. The results of these simulation are shown in FIG. 6B. Of these simulations, the simulation with Δh=4 μm and Δl=4 μm showed little change from the reference structure. The simulation with Δh=4 μm and Δl=2 μm showed the greatest improvement (increase) in displacement as compared to the reference structure, with a displacement at the membrane center of 0.430 nm. The upper and lower piezoelectric layers exhibited slightly different radii of curvature with the upper piezoelectric layer exhibiting greater curvature than the lower piezoelectric layer adjacent the $SiO_2$ anchor. This effect was small and most easily observed in the simulation with Δh=4 μm and Δl=2 μm. In the other simulations, the upper and lower layers exhibited similar curvature and it is difficult to discern one plot from another.

Simulations were performed to determine the effect of $SiO_2$ anchor width Δl with height Δh fixed at 3 μm on output voltage (sensitivity) and resonant frequency in a diaphragm PMM having the characteristics described above. The capacitance of the electrodes of the simulated PMM was 1.53 pF and the tan D parameter was 0.003. As used herein, the parameter tan D is the dielectric loss parameter for the piezoelectric film, that depends on deposition condition and film quality—dislocation density, lattice mismatching, etc. The parameter characterizes how much electrical energy trapping due to free electrons exists in the piezoelectric film.

Figure 7A:
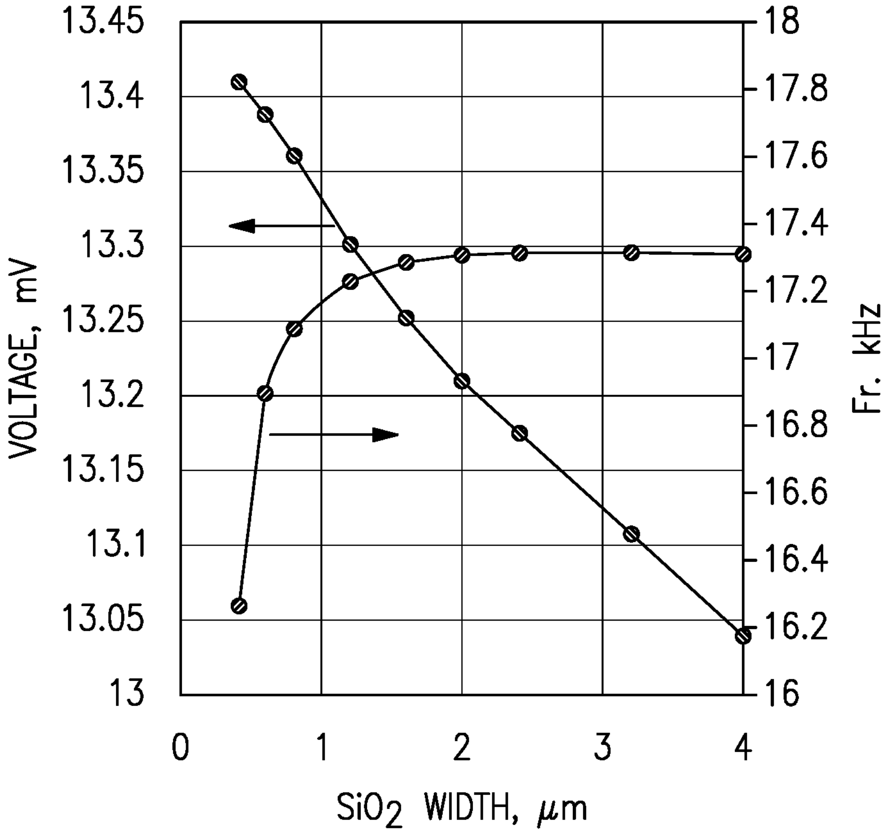
FIG. 7A illustrates results of simulations of output voltage and resonant frequency as a function of anchor width in a diaphragm PMM.

Simulations were performed in which the anchor width Δl was varied between 0.5 μm and 4 μm. The results of these simulations are shown in FIG. 7A. As can be observed, the resonant frequency of the simulated PMM increased with $SiO_2$ anchor width although little improvement was shown as the $SiO_2$ anchor width increased beyond about 2 μm. A higher resonant frequency for a PMM is generally desirable as the resonant frequency is associated with the highest frequency the PMM can accurately detect. The output voltage (sensitivity) of the simulated PMM increased with decreasing $SiO_2$ anchor width. There was thus a tradeoff between resonant frequency and sensitivity with changes in $SiO_2$ anchor width.

Figure 7B:
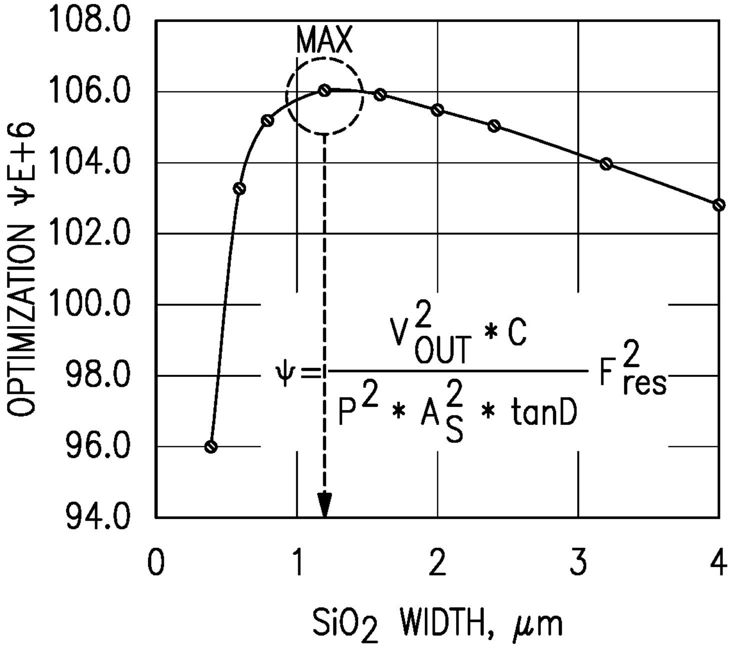
FIG. 7B illustrates results of a simulation of a figure of merit as a function of anchor width in a diaphragm PMM.

Also evaluated was a figure of merit Ψ that may be used to compare the performance of different PMMs. This figure of merit is determined from the equation:

$$\Psi = \frac{V_{out}^2 * C}{P^2 * A_S^2 * \tan D} F_{res}^2$$

where $V_{out}$ is the output voltage of the PMM, C is the capacitance of the electrodes of the PMM, P is applied sound pressure, $A_s$ is the area of the PMM membrane, tan D is a constant, and $F_{res}$ is the resonant frequency of the PMM. A chart of Ψ as a function of $SiO_2$ anchor width is provided in FIG. 7B. This chart indicates that Ψ is maximized at a $SiO_2$ anchor width of 1.2 μm for the simulated PMM. PMMs with different configurations may exhibit a maximum in Ψ at different anchor widths.

Figure 8:
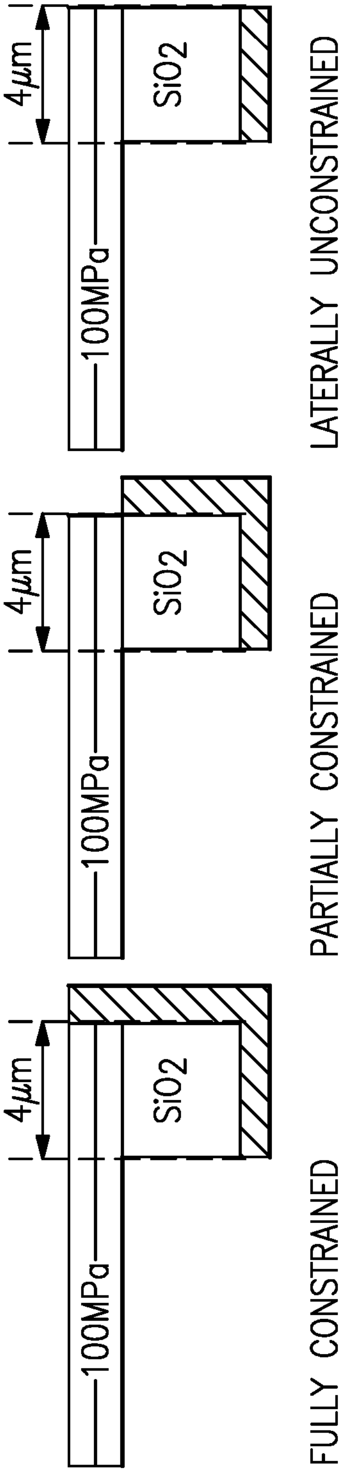
FIG. 8 illustrates different forms of constraint conditions for an anchor of a PMM.

Further simulations were performed to determine stress and strain at the outer edge of a PMM membrane having a residual stress of 100 MPA under different conditions of constraint of an $SiO_2$ anchor with a length and height of 4 μm. The different constraint conditions included a) one in which both the bottom and outside edge of the $SiO_2$ anchor as well as the outside edge of the PMM membrane were fully constrained (the "fully constrained" condition in FIG. 8), b) one in which both the bottom and outside edge of the $SiO_2$ anchor were fully constrained, but the outside edge of the PMM membrane was unconstrained (the "partially constrained" condition in FIG. 8), and c) one in which the bottom of the $SiO_2$ anchor was constrained, but the outside edge of the PMM membrane and outside edge of the $SiO_2$ anchor were unconstrained (the "laterally unconstrained" condition in FIG. 8).

Figure 9A:
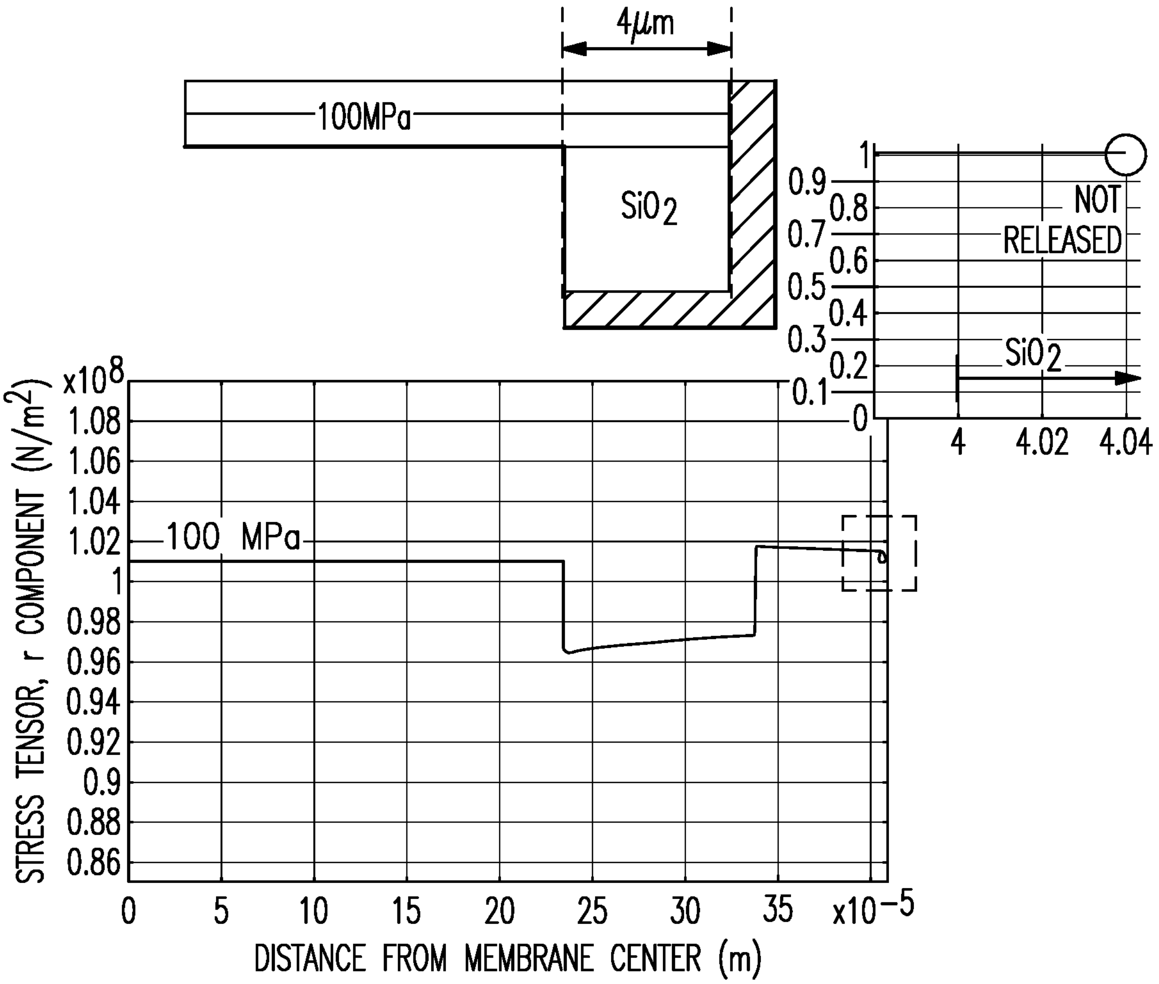
FIG. 9A illustrates results of a simulation of stress as a function of distance across a membrane of an example diaphragm PMM having an anchor with a first of the constraint conditions of FIG. 8.
Figure 9B:
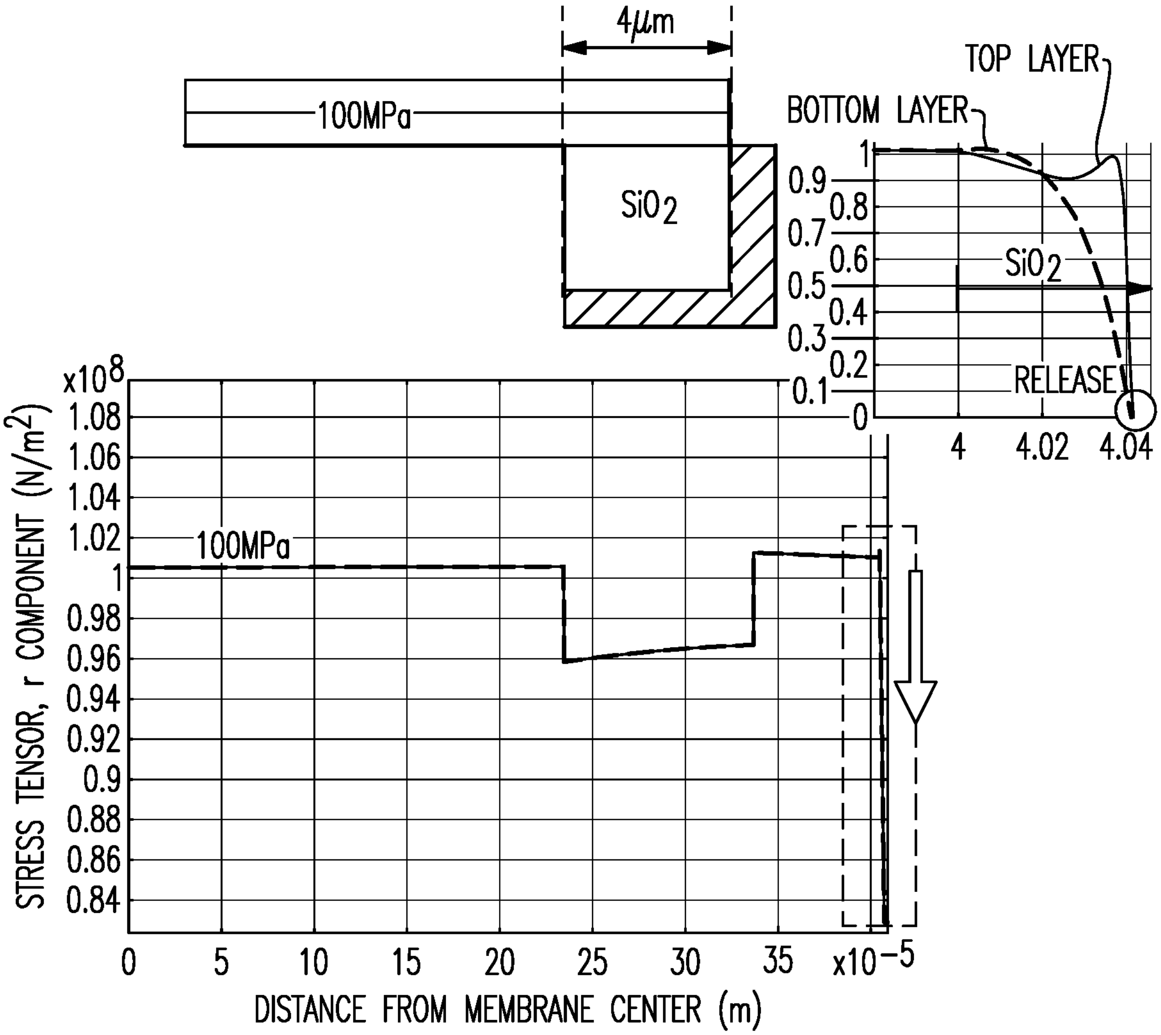
FIG. 9B illustrates results of a simulation of stress as a function of distance across a membrane of an example diaphragm PMM having an anchor with a second of the constraint conditions of FIG. 8.
Figure 9C:
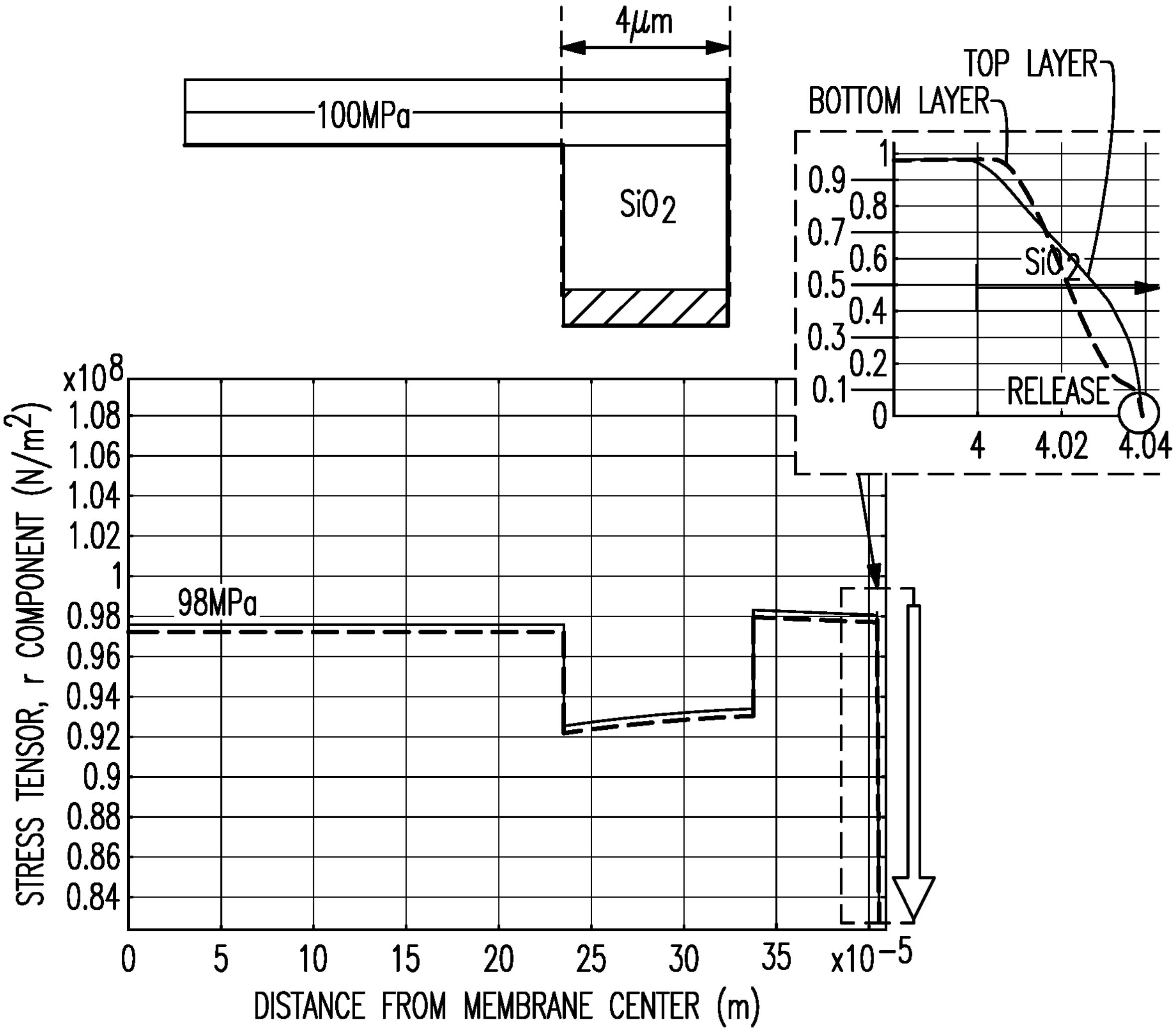
FIG. 9C illustrates results of a simulation of stress as a function of distance across a membrane of an example diaphragm PMM having an anchor with a third of the constraint conditions of FIG. 8.

The results of simulations of stress in the PMM membranes under the three different constraint conditions are illustrated in FIGS. 9A-9C. For the "fully constrained" condition (FIG. 9A) there was little stress relief at the edge of the PMM membrane. For the "partially constrained" condition (FIG. 9B), stress relief was observed at the edge of the PMM membrane with stress in the lower piezoelectric film dropping off more quickly with distance toward the edge of the membrane than stress in the upper piezoelectric film. For the "laterally unconstrained" condition (FIG. 9C), greater stress relief was observed than for the "partially constrained" condition at the edge of the PMM membrane, again with stress in the lower piezoelectric film dropping off more quickly with distance toward the edge of the membrane than stress in the upper piezoelectric film. Although stress profile is plotted for both the top and bottom piezoelectric layers, differences between the two are only noticeable in FIG. 9C.

Figure 10A:
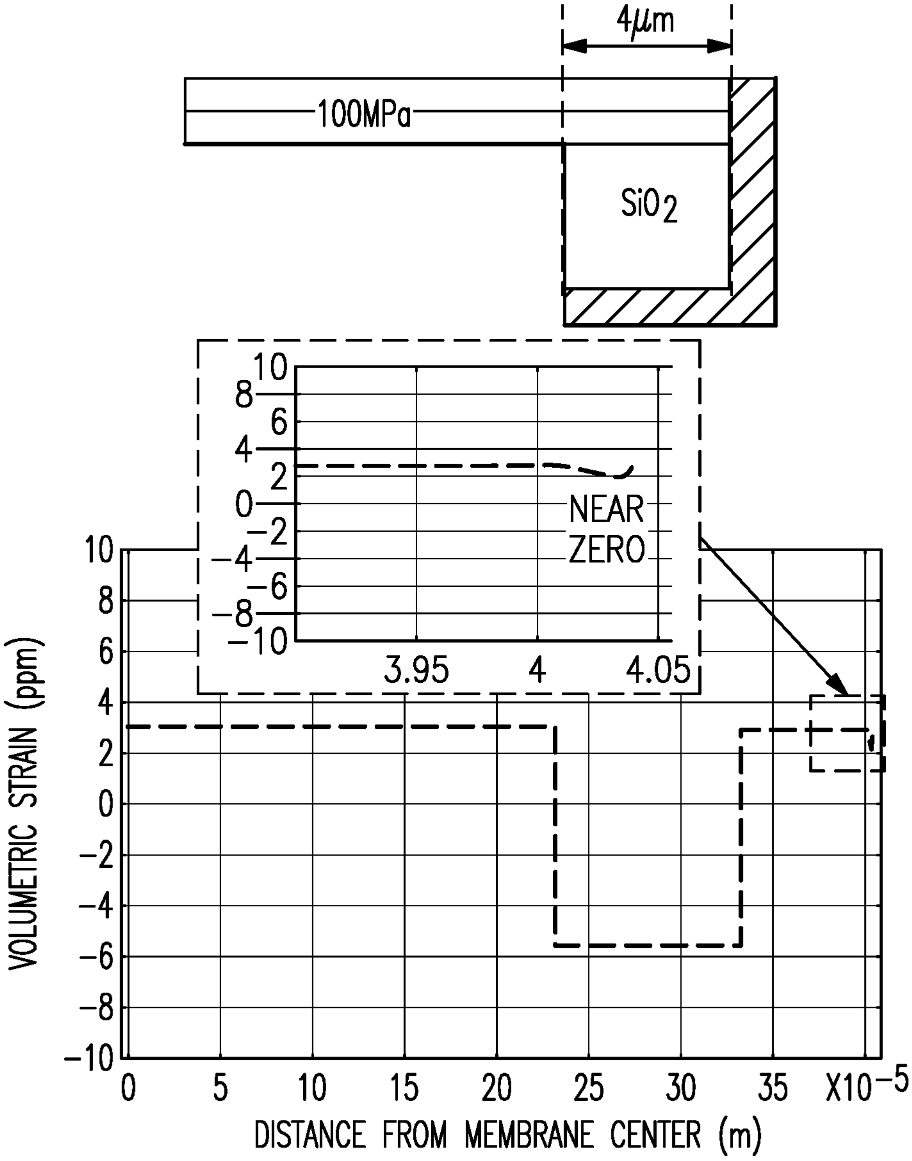
FIG. 10A illustrates results of a simulation of strain as a function of distance across a membrane of an example diaphragm PMM having an anchor with a first of the constraint conditions of FIG. 8.
Figure 10B:
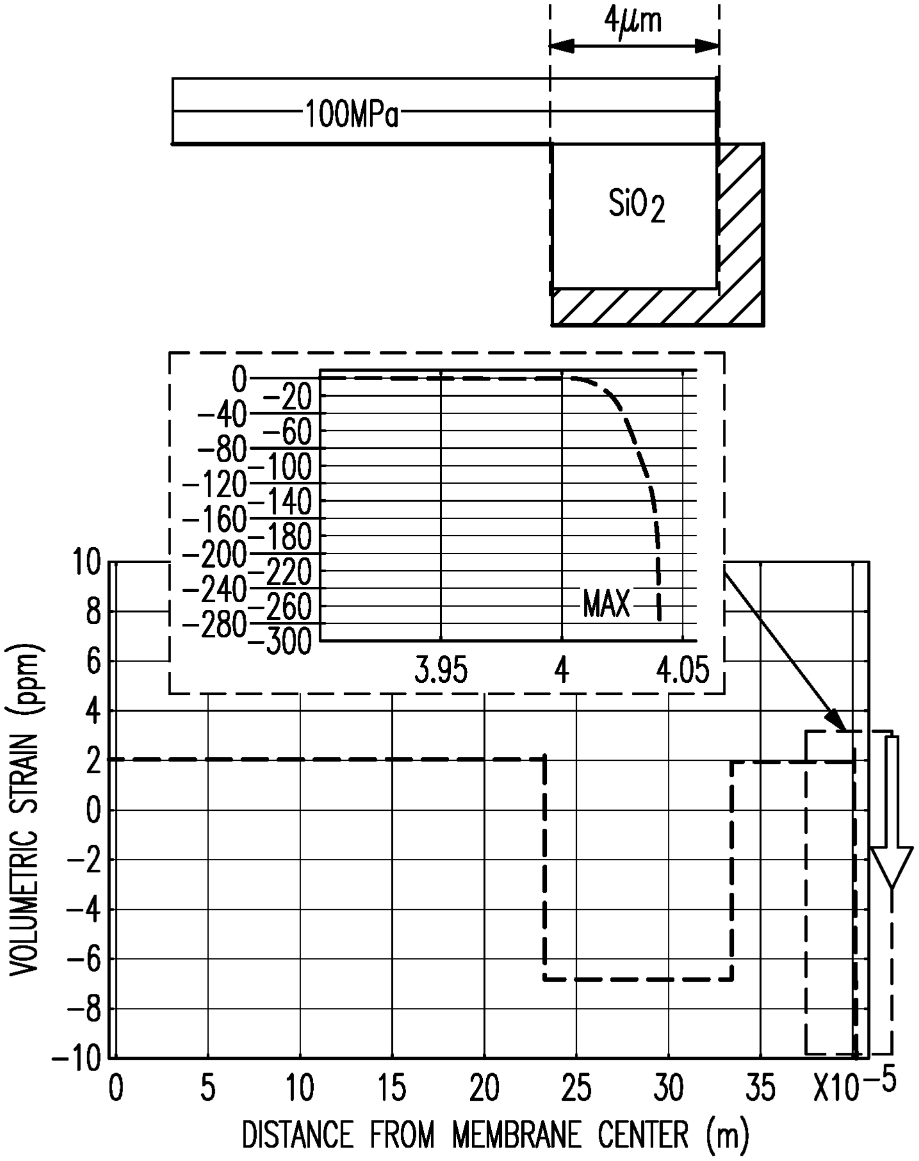
FIG. 10B illustrates results of a simulation of strain as a function of distance across a membrane of an example diaphragm PMM having an anchor with a second of the constraint conditions of FIG. 8.
Figure 10C:
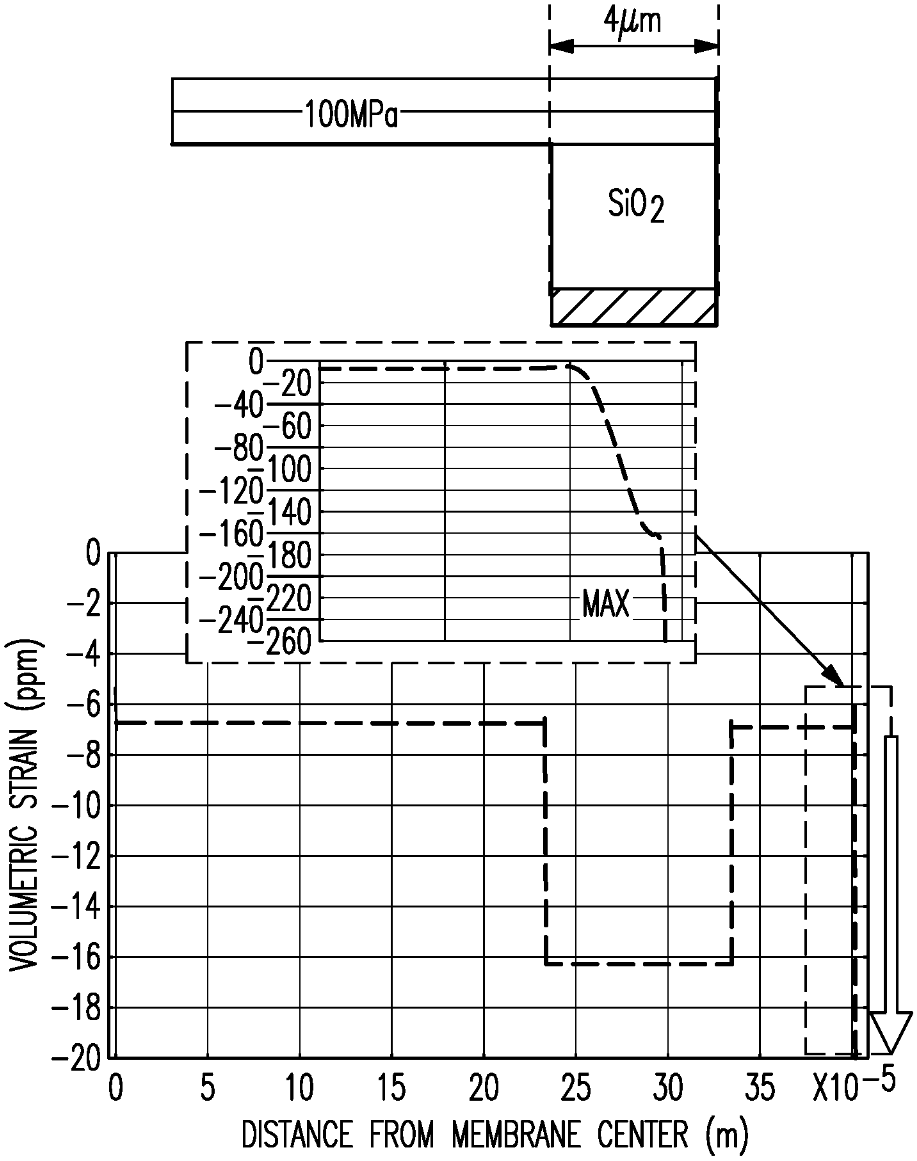
FIG. 10C illustrates results of a simulation of strain as a function of distance across a membrane of an example diaphragm PMM having an anchor with a third of the constraint conditions of FIG. 8.

The results of simulations of strain in the PMM membranes under the three different constraint conditions are illustrated in FIGS. 10A-10C. For the "fully constrained" condition (FIG. 10A) there was little strain variation at the edge of the PMM membrane. For the "partially constrained" condition (FIG. 10B), strain in the PMM membrane dropped off quickly approaching the edge of the PMM membrane. For the "laterally unconstrained" condition (FIG. 10C), a greater drop in strain in the PMM membrane approaching the edge of the PMM membrane was observed than for the "partially constrained" condition.

Figure 11A:
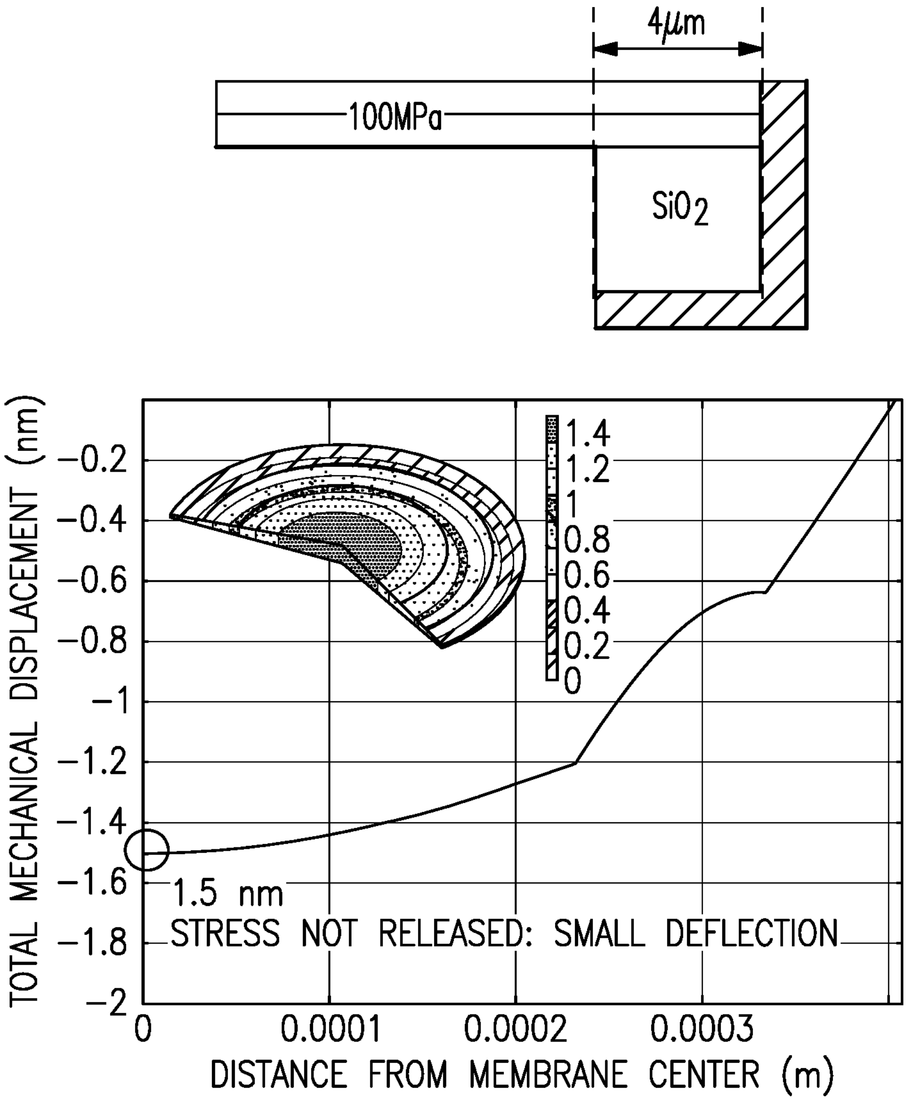
FIG. 11A illustrates results of a simulation of membrane displacement as a function of distance across the membrane of an example diaphragm PMM having an anchor with a first of the constraint conditions of FIG. 8.
Figure 11B:
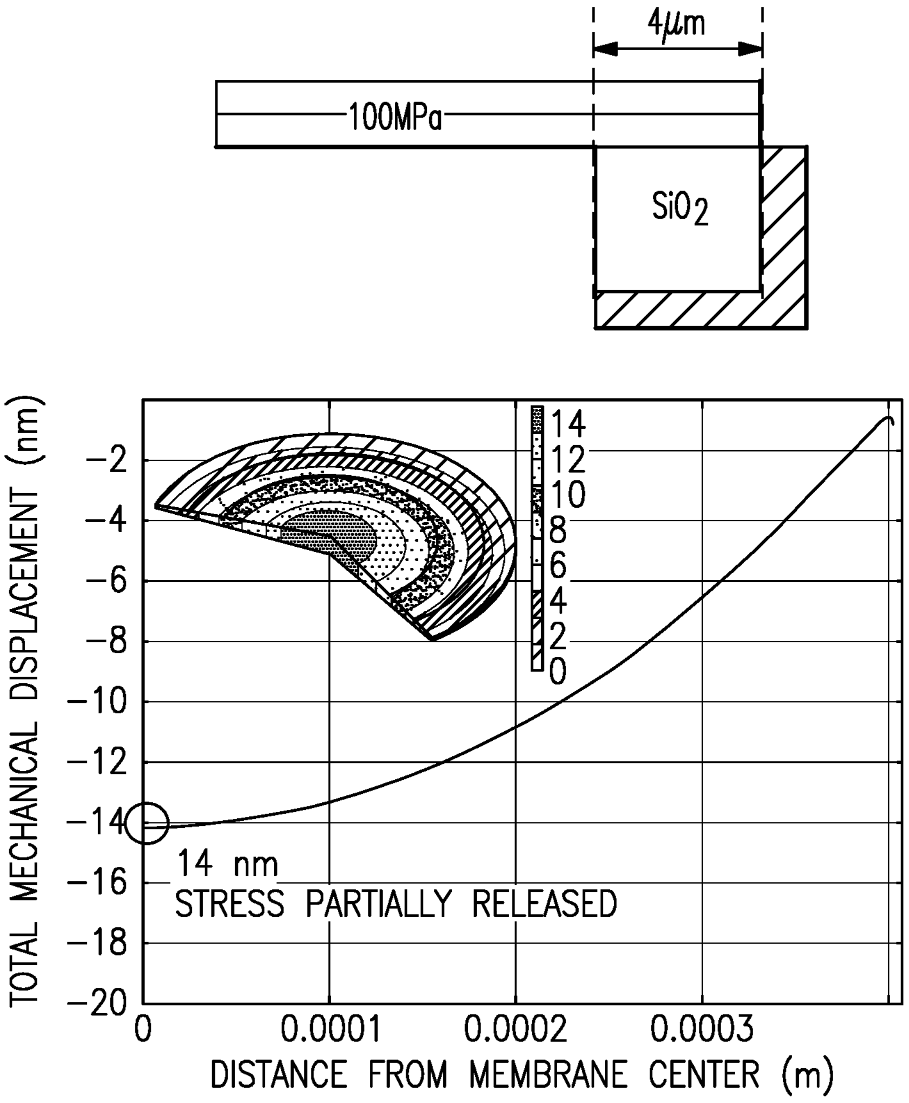
FIG. 11B illustrates results of a simulation of membrane displacement as a function of distance across the membrane of an example diaphragm PMM having an anchor with a second of the constraint conditions of FIG. 8.
Figure 11C:
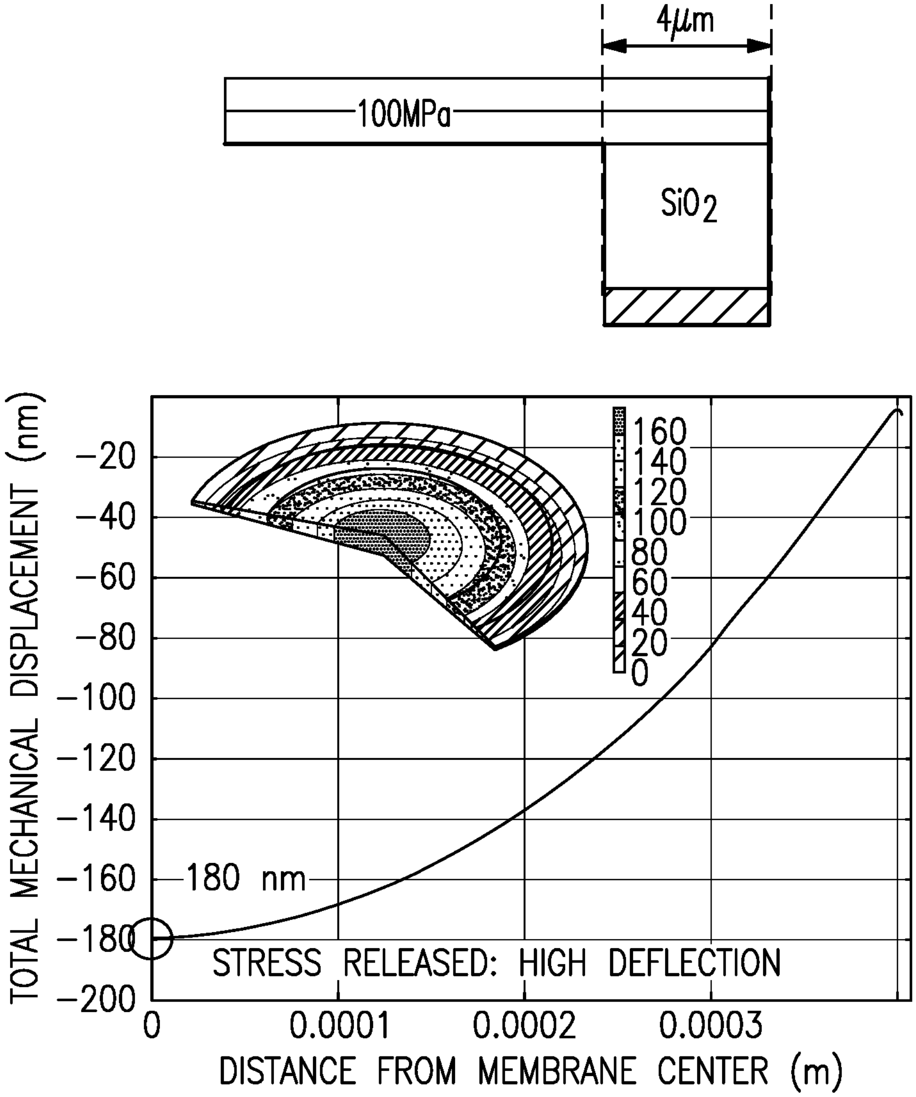
FIG. 11C illustrates results of a simulation of membrane displacement as a function of distance across the membrane of an example diaphragm PMM having an anchor with a third of the constraint conditions of FIG. 8.

Simulations were also performed to evaluate membrane deflection for the three constraint conditions. The results are illustrated in FIGS. 11A-11C. Deflection of the center of the membrane increased marginally from 1.5 nm to 14 nm when moving from the "fully constrained" condition to the "partially constrained" condition. Deflection of the center of the membrane increased significantly from 14 nm to 180 nm when moving from the "partially constrained" condition to the "laterally unconstrained" condition, which indicates that constraining the $SiO_2$ anchor only at its lower surface can provide for significant membrane deflection to relieve residual stresses, and an expected corresponding increase in PMM sensitivity.

Figure 12:
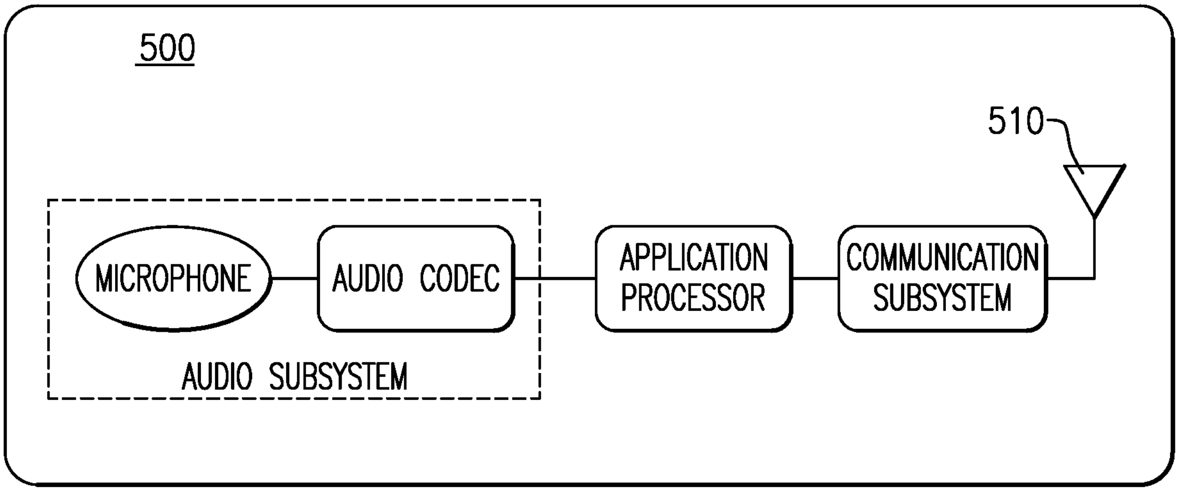
FIG. 12 is a block diagram of one example of a wireless device and that can include one or more PMMs according to aspects of the present disclosure.

Examples of MEMS microphones as disclosed herein can be implemented in a variety of packaged modules and devices. FIG. 12 is a schematic block diagrams of an illustrative device 500 according to certain embodiments.

The wireless device 500 can be a cellular phone, smart phone, tablet, modem, communication network or any other portable or non-portable device configured for voice or data communication. The wireless device 500 can receive and transmit signals from the antenna 510.

The wireless device 500 may include one or more microphones as disclosed herein. The one or more microphones may be included in an audio subsystem including, for example, an audio codec. The audio subsystem may be in electrical communication with an application processor and communication subsystem that is in electrical communication with the antenna 510. As would be recognized to one of skill in the art, the wireless device would typically include a number of other circuit elements and features that are not illustrated, for example, a speaker, an RF transceiver, baseband sub-system, user interface, memory, battery, power management system, and other circuit elements.

The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a range from about 30 kHz to 10 GHz, such as in the X or Ku 5G frequency bands.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A piezoelectric microelectromechanical system microphone comprising:

a support substrate;

a membrane including a piezoelectric material attached to the support substrate and configured to deform and generate an electrical potential responsive to impingement of sound waves on the membrane; and a compliant anchor including a trench defined in the support substrate about a portion of a perimeter of the membrane to increase sensitivity of the piezoelectric microelectromechanical system microphone.

2. The piezoelectric microelectromechanical system microphone of claim 1 wherein the support substrate includes an upper layer of silicon dioxide and the trench is formed in the upper layer of silicon dioxide.

3. The piezoelectric microelectromechanical system microphone of claim 2 wherein the trench extends through an entirety of a thickness of the upper layer of silicon dioxide.

4. The piezoelectric microelectromechanical system microphone of claim 1 wherein the compliant anchor extends about a majority of the perimeter of the membrane.

5. The piezoelectric microelectromechanical system microphone of claim 1 wherein the membrane is circular.

6. The piezoelectric microelectromechanical system microphone of claim 1 wherein the trench has a length and a substantially same width along an entirety of the length.

7. The piezoelectric microelectromechanical system microphone of claim 1 wherein the trench has a same height as the membrane.

8. The piezoelectric microelectromechanical system microphone of claim 1 wherein an inner wall of the trench is aligned with an outer edge of the membrane.

9. The piezoelectric microelectromechanical system microphone of claim 1 further comprising a polymer disposed in the trench.

10. The piezoelectric microelectromechanical system microphone of claim 1 further comprising a material disposed in the trench and having a temperature coefficient of expansion opposite in sign to a temperature coefficient of expansion of silicon dioxide.

11. The piezoelectric microelectromechanical system microphone of claim 1 having a diaphragm type structure.

12. The piezoelectric microelectromechanical system microphone of claim 1 having a cantilever type structure.

13. The piezoelectric microelectromechanical system microphone of claim 1 wherein the compliant anchor is formed of a silicon dioxide film having a greater height than a width.

14. The piezoelectric microelectromechanical system microphone of claim 13 wherein the trench defines an outer surface of the silicon dioxide film.

15. The piezoelectric microelectromechanical system microphone of claim 13 wherein a lower surface of the silicon dioxide film is adhered to a silicon portion of the support substrate.

16. An electronics device module including the piezoelectric microelectromechanical system microphone of claim 1.

17. An electronic device including the electronic device module of claim 16.

18. A telephone including the electronic device module of claim 16.

* * * * *